Figure 5:
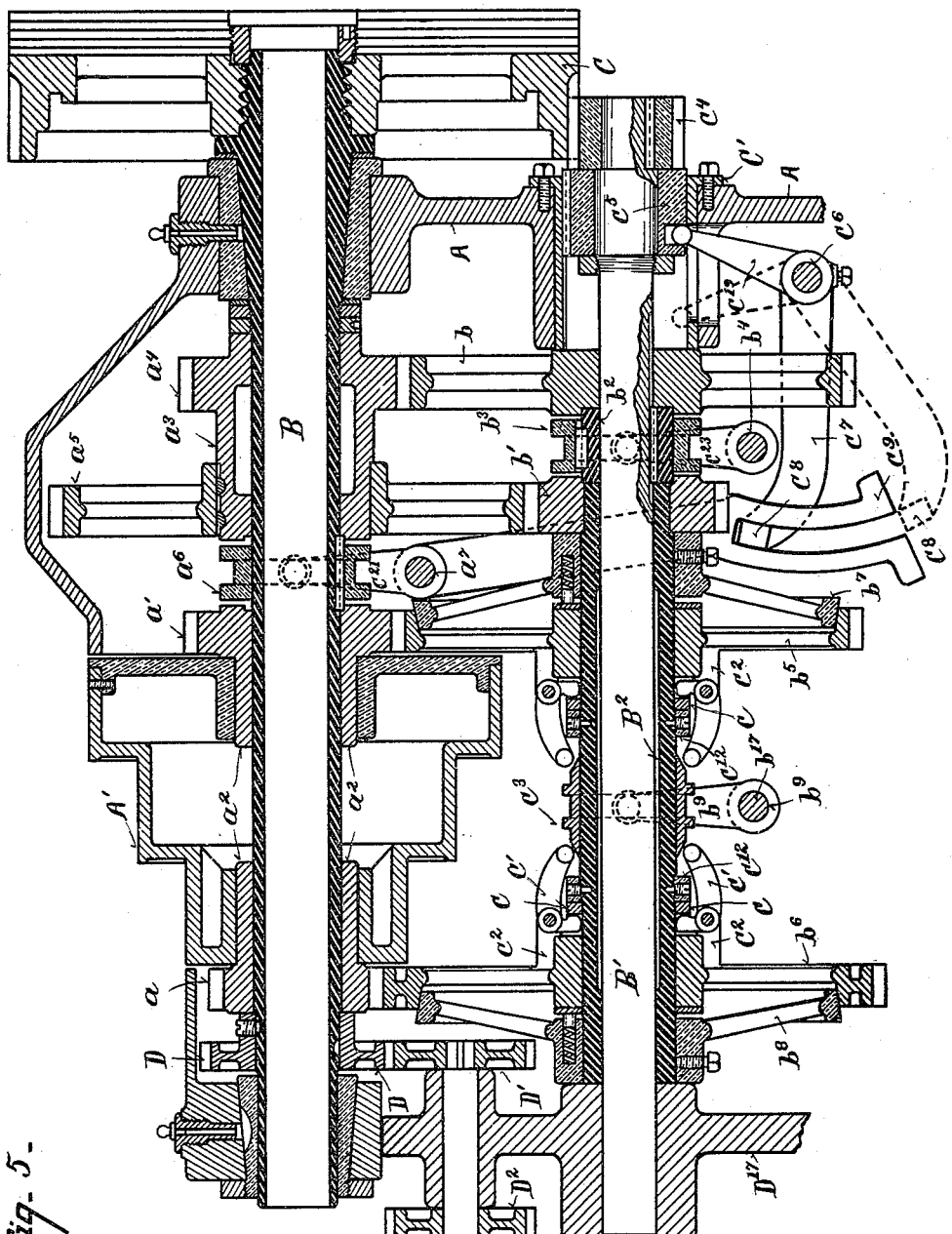

No. 639,888. Patented Dec. 26, 1899.
C. M. CONRADSON.
TURRET LATHE.
(Application filed Feb. 24, 1899.)
(No Model.) 7 Sheets—Sheet 1.
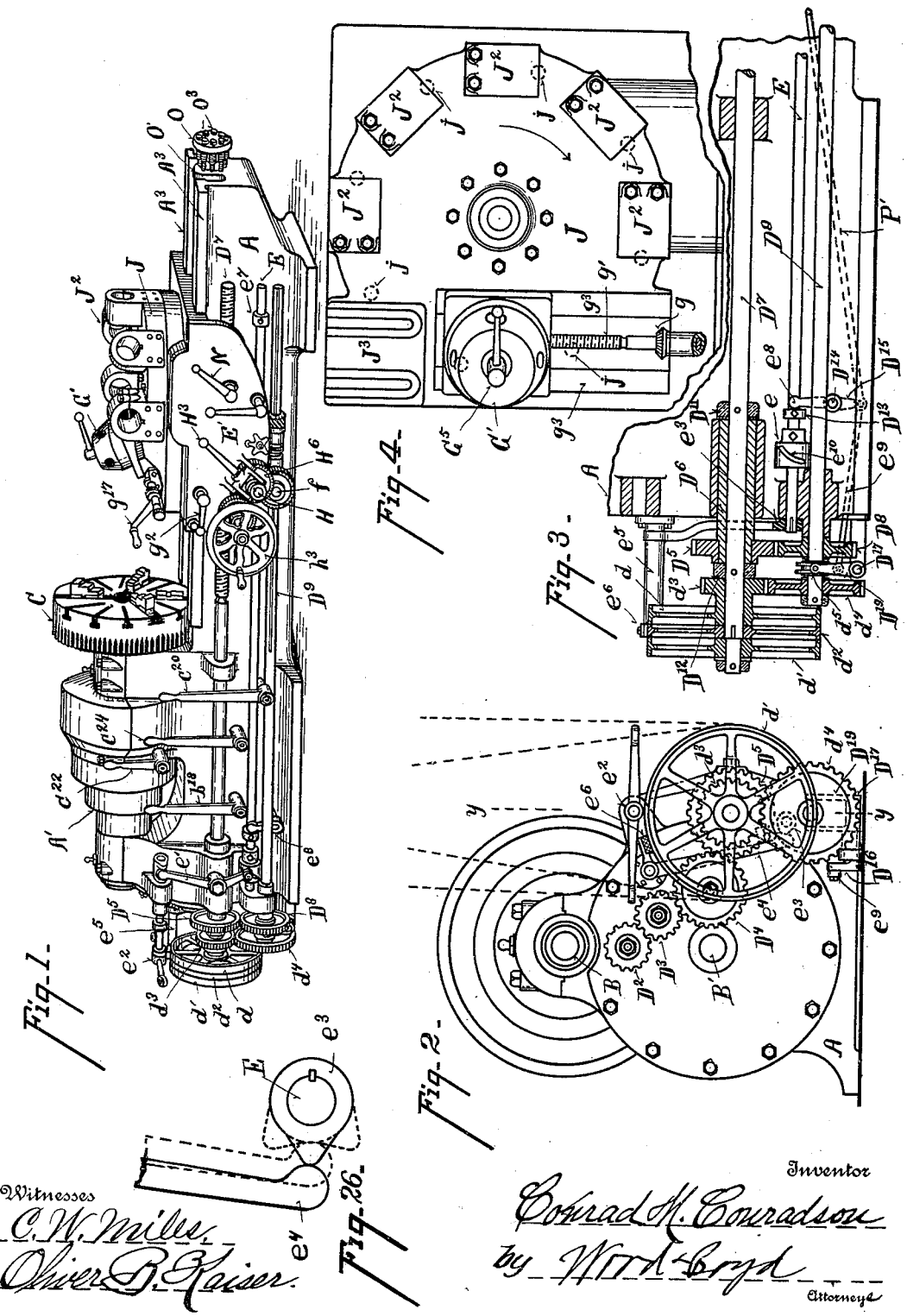
Witnesses
C. W. Mills
Oliver B. Keiser
Inventor
Conrad M. Conradson
by Wood & Boyd
Attorneys No. 639,888. Patented Dec. 26, 1899.
C. M. CONRADSON.
TURRET LATHE.
(Application filed Feb. 24, 1899.)
(No Model.) 7 Sheets—Sheet 2.

Witnesses
C. W. Miles
Oliver B. Kaiser

Inventor
Conrad M. Conradson
by Word & Boyd
Attorneys

No. 639,888. Patented Dec. 26, 1899.
C. M. CONRADSON.
TURRET LATHE.
(Application filed Feb. 24, 1899.)
(No Model.) 7 Sheets—Sheet 3.
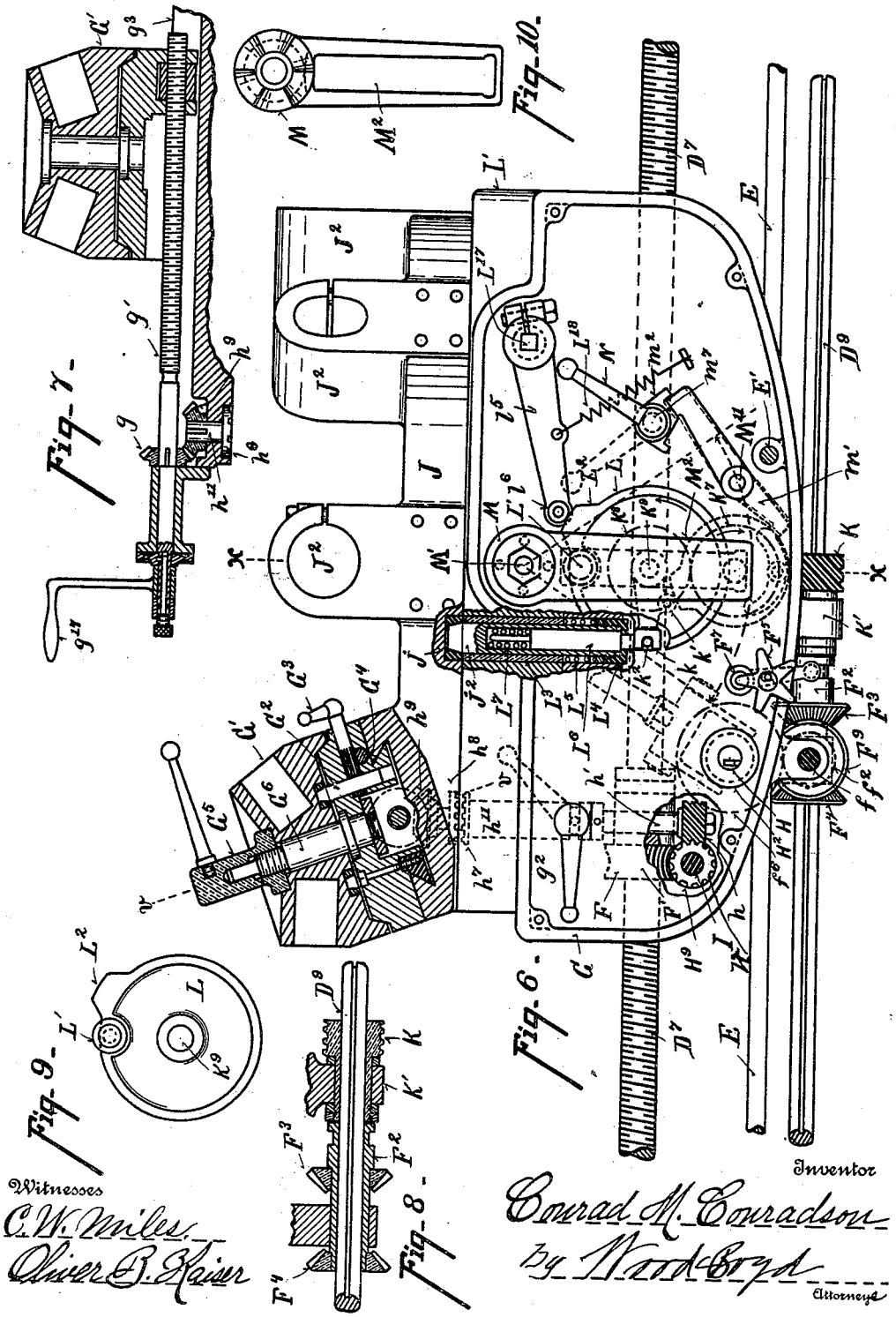

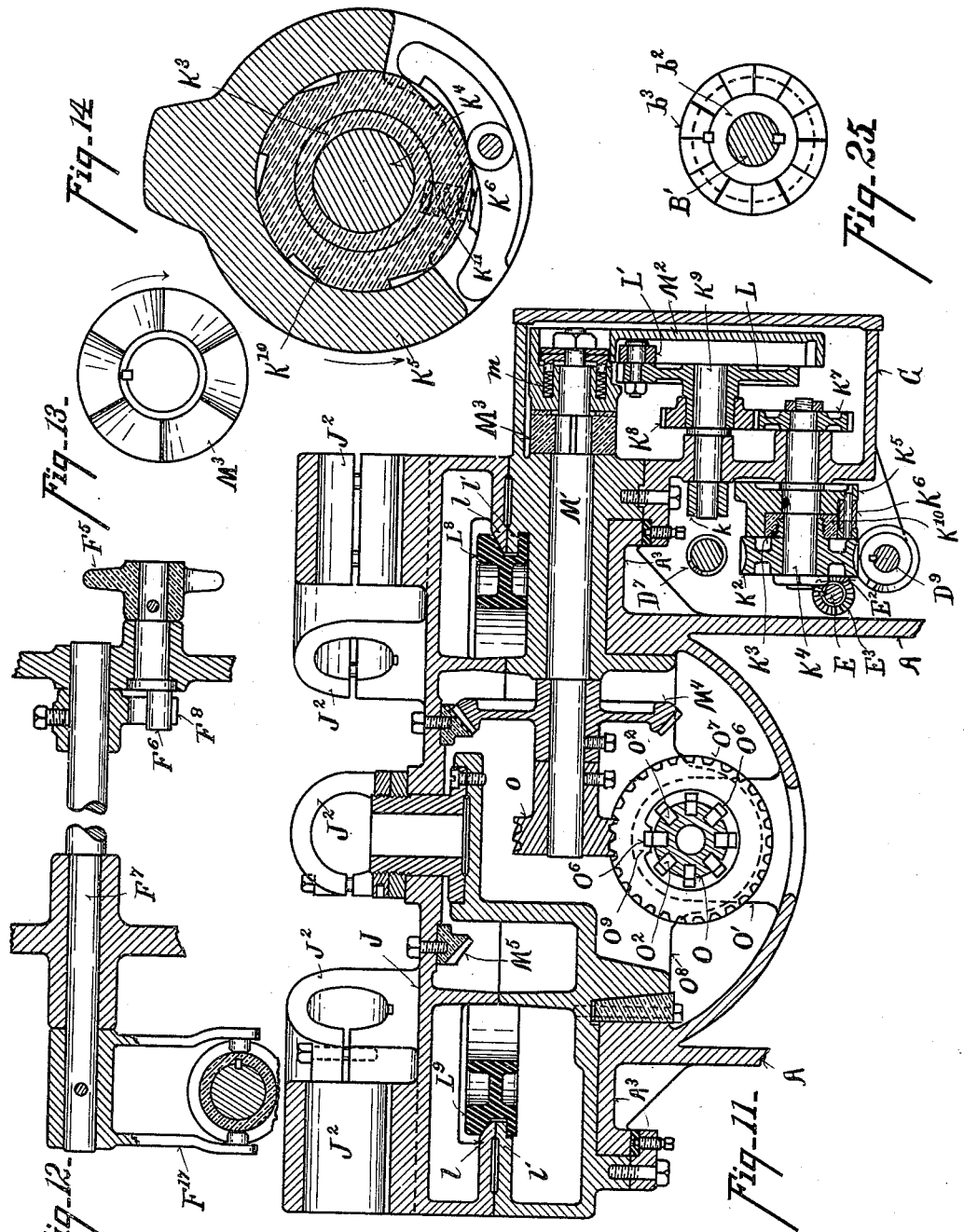

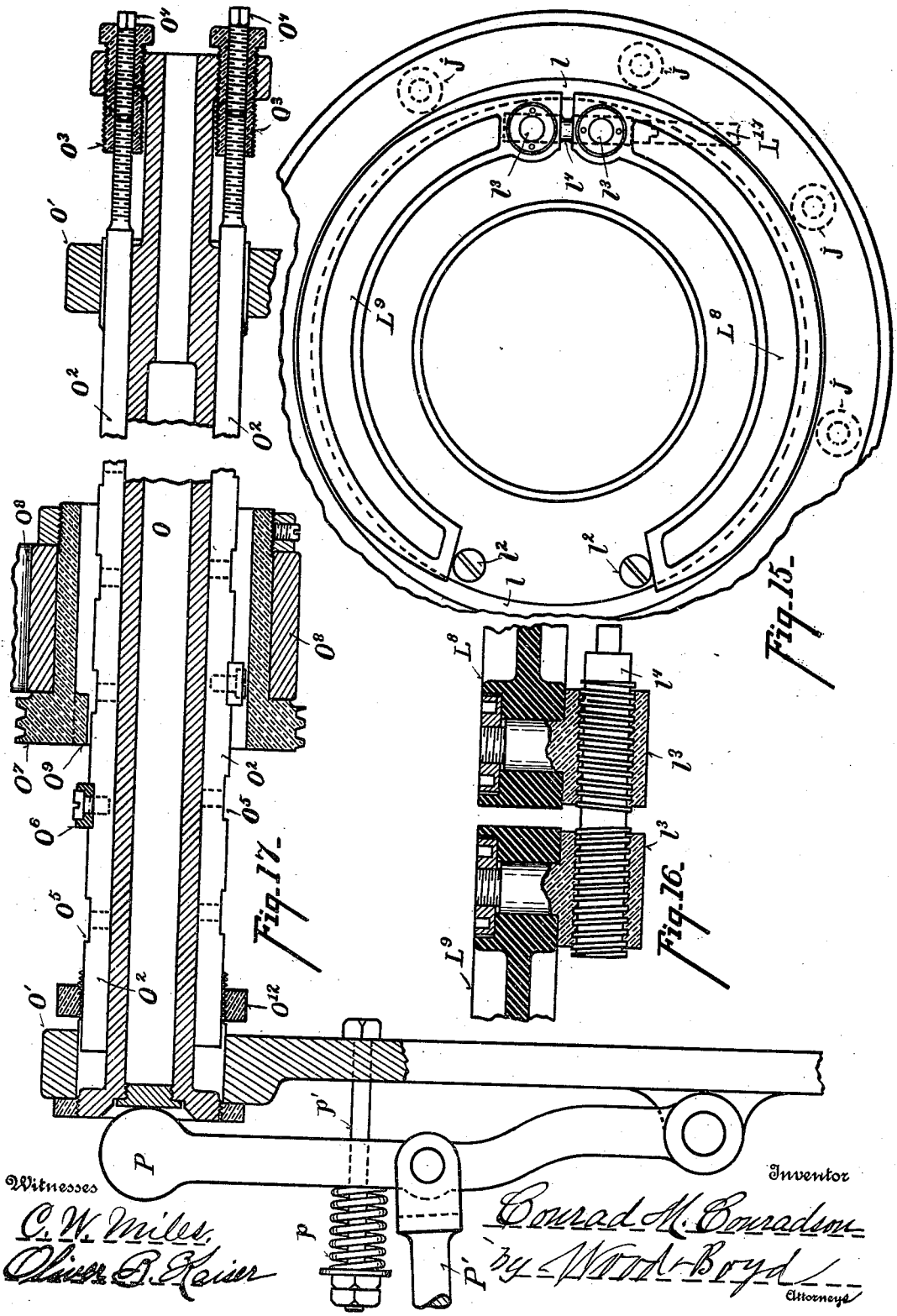

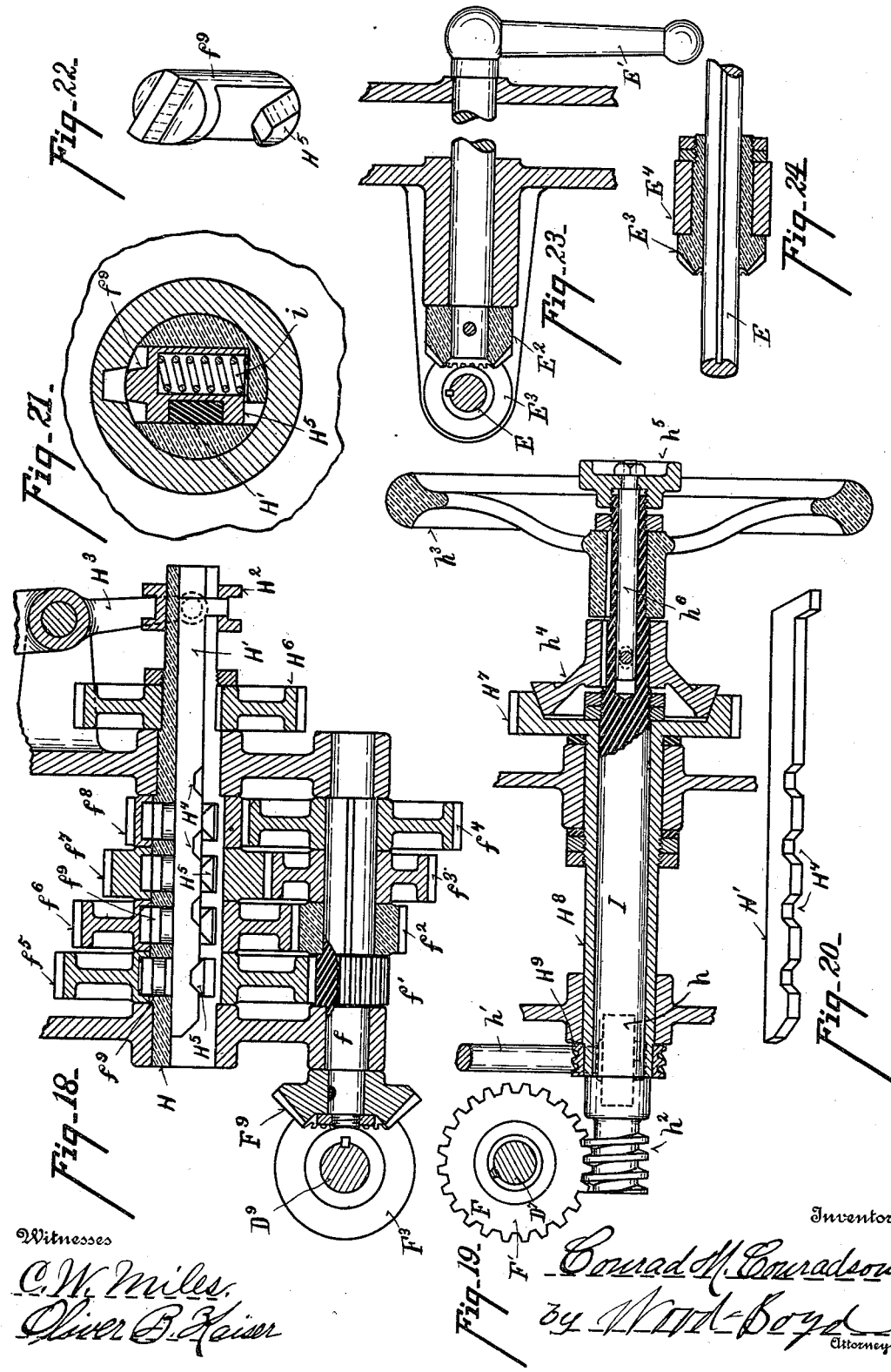

No. 639,888. Patented Dec. 26, 1899.
C. M. CONRADSON.
TURRET LATHE.
(Application filed Feb. 24, 1899.)
(No Model.) 7 Sheets—Sheet 7.
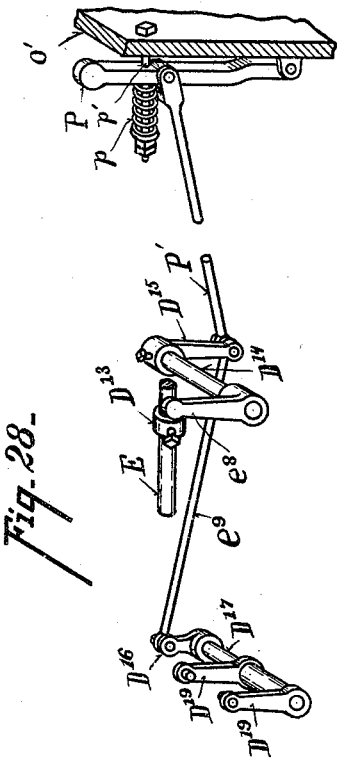
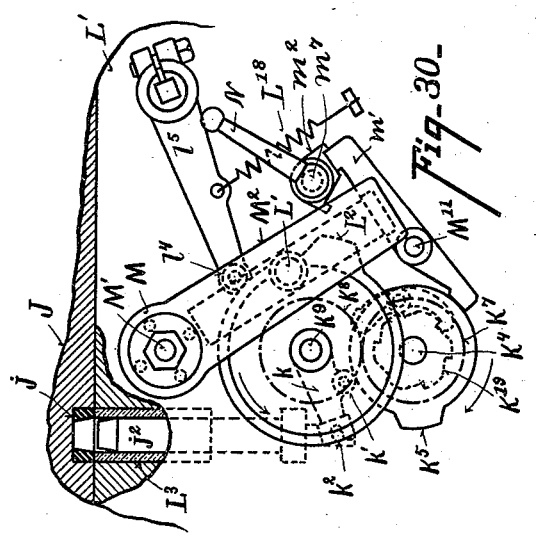
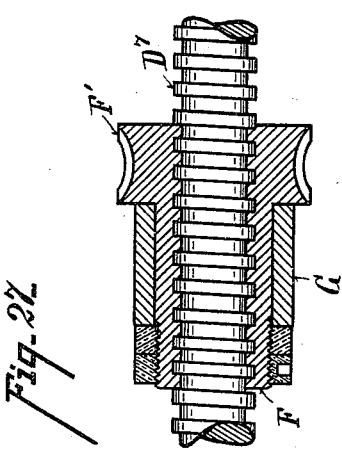
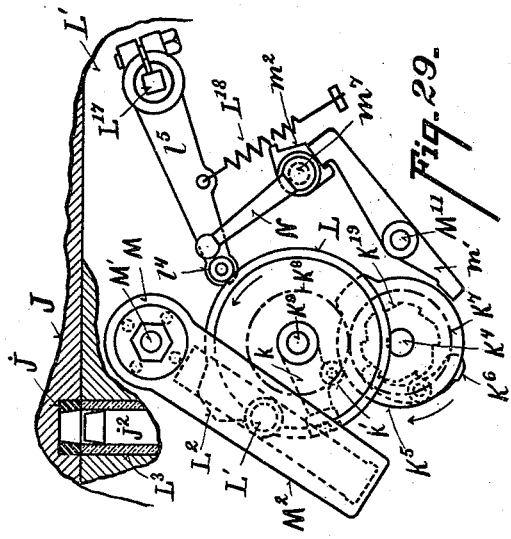
Witnesses
C. W. Miles
Oliver B. Kaiser
Inventor
Conrad M. Conradson
by Wood Boyd
Attorneys

UNITED STATES PATENT OFFICE.

CONRAD M. CONRADSON, OF MADISON, WISCONSIN, ASSIGNOR TO THE AMERICAN TURRET LATHE WORKS COMPANY, OF CINCINNATI, OHIO.

TURRET-LATHE.

SPECIFICATION forming part of Letters Patent No. 639,888, dated December 26, 1899.

Application filed February 24, 1899. Serial No. 706,634. (No model.)

*To all whom it may concern:*

Be it known that I, CONRAD M. CONRADSON, residing at Madison, in the county of Dane and State of Wisconsin, have invented certain new and useful Improvements in Turret-Lathes, of which the following is a specification.

My invention relates to turret-lathes and comprises, first, means for rapidly traversing the turret backward and forward on the bed by power; second, a hand adjustment working in connection with the power-traverse for adjusting the turret over small distances; third, providing means for rotating the turret by power; fourth, providing means for automatically registering the turret by power; fifth, providing power devices for automatically clamping the turret; sixth, providing the main turret with a supplemental turret or tool-post mounted so as to traverse at right angles to the axis when the turret is in operative position; seventh, providing said supplemental turret or tool-post with power cross-feed devices; eighth, inclining the supplemental turret or tool-post for the purpose set forth; ninth, providing feed-stop devices for stopping the feed at any point of the traverse of the turret and having independent adjustments for each tool in the turret; tenth, providing rapid and convenient means for varying the feed of the turret as well as for reversing its travel, and, eleventh, providing means for driving the work at greatly-varying speeds.

The features of my invention are more fully set forth in the description of the accompanying drawings, making a part of this specification, in which—

Figure 1 is a perspective view of the turret-lathe. Fig. 2 is a front end elevation. Fig. 3 is a section on line *y y*, Fig. 2. Fig. 4 is a plan view of the main and supplementary turrets. Fig. 5 is a central vertical section through the spindle and back gear-shaft. Fig. 6 is a side elevation of the turret and apron, showing sections of various parts. Fig. 7 is a vertical section through the supplementary turret and its feed-shaft. Fig. 8 is a sectional view of the bevel reversing-gears and spiral rotating gear. Fig. 9 is an end view of the turret-rotating crank, showing turret-clamp cam. Fig. 10 is a plan view of turret-rotating lever. Fig. 11 is a transverse vertical central section of the turret and turret-apron. Fig. 12 shows a detail of the turret-feed-reversing mechanism. Fig. 13 is an end view of the fixed member of the turret-rotating clutch. Fig. 14 is an end view of the turret-rotating clutch and cam-actuating locking-pin. Fig. 15 is a plan view of the turret-clamping mechanism. Fig. 16 is a detail of the right and left hand clamp-actuating screw. Fig. 17 is a longitudinal central section and partial elevation of an automatic independently-adjustable longitudinal feed-stop mechanism. Fig. 18 is a vertical central section through the feed change-gears. Fig. 19 is a detail view showing the turret-feed-actuating mechanism, longitudinal feed-clutch, and spiral gears for actuating transverse feed of auxiliary turret tool-post. Fig. 20 is a perspective view of change-gear-actuating slide-bar. Fig. 21 is a section through the change-gear key. Fig. 22 is a perspective view of change-gear key. Fig. 23 is a detail showing turret-traversing lever and its gear connection to turret-traversing splined rod. Fig. 24 is a section through belt-shifting gear. Fig. 25 is a cross-section through double-ended tooth-clutch $b^3$, transmitting-collar $b^2$, and back gear-shaft B'. Fig. 26 is a detail view of the automatic brake setting and releasing mechanism. Fig. 27 is a detail sectional view of the tool-feeding revoluble nut on the screw feed-shaft. Fig. 28 is a detail perspective view of the automatic turret feed-stop and reversing mechanism. Figs. 29 and 30 are detail views similar to Fig. 6, showing the turret releasing and revolving mechanism in different positions.

The principal characteristics of the turret-lathe are, first, driving-shafts composed of the main spindle, and a system of gears mounted on said shaft and on a sleeve journaled thereon, and an auxiliary driving-shaft with gears journaled on the same, and also clutch-gears journaled on a sleeve mounted on said auxiliary shaft, whereby a large range of speeds may be obtained for driving the spindle.

Another characteristic of my improved lathe is the employment of a shaft whose primary object is to move the tool-carriage at a high rate of speed, which I term the "traversing" speed. This shaft is driven independent of the lathe-spindle and preferably by a counter-shaft. (Not shown in the drawings.) In connection with this traversing shaft I employ a secondary shaft for operating the various feeds of the lathes, which I term the "work-shaft." This shaft has appliances for being driven directly from the main spindle of the lathe for feeding the tools or by the traversing shaft when it is desired to obtain a high speed for revolving the turret.

A third characteristic feature of my lathe is the employment of a main revoluble turret and a supplemental turret revolubly mounted on the main turret and adapted to be fed by power transversely to the line of travel of the main turret.

A fourth characteristic feature of my invention relates to power mechanism for revolving the main turret and for locking and unlocking the same automatically.

A fifth characteristic of my lathe is the employment of a supplemental tool-holder traveling upon and across the line of travel of the main turret, and power devices for feeding the same.

This lathe is adapted to do heavy work not usually performed by turret-lathes, and its features of construction have peculiar reference to new work which is desired to be performed.

I will first describe the mechanism for driving the spindle at varying speeds.

Referring to Fig. 5, A is the bed or main frame of the machine, supporting at one end the work-carrying spindle B in suitable journals and provided with proper means for taking up wear. On the spindle-nose is firmly fixed, by threading or otherwise, the chuck or face-plate C, having a gear on its periphery engaging with pinion $c^4$, which is driven by the back gear-shaft B', on which it is feathered, and so arranged as to permit its being slid out of mesh with the gear on the outside of the chuck. The driving cone-pulley A' has fixed to it at either end pinions $a$ and $a'$ and runs loosely on spindle B. The back gear-shaft B' is preferably arranged directly beneath the spindle $B^2$ and carries loosely mounted on it a sleeve $B^2$, which in turn supports the gear-wheels $b^6$ and $b^5$. These gears are provided with conical friction-surfaces adapted to engage with the fixed clutch members $b^7$ and $b^8$. $b^6$ and $b^5$ are each provided with bell-crank levers $c'$, which are pivoted to the lug $c^2$, which is fast on the hub of the pulleys $b^5$ $b^6$. One arm of these bell-crank levers $c'$ depends downward between the loose collar $c$, against which it bears, and the hub of the wheel. The other ends of said bell-crank levers bear, respectively, upon the clutch-collar $c^3$. When the clutch-collar is thrown in one direction, it lifts up the forward end of the bell-crank lever, which forces the hub of the pulley—say $b^6$—laterally on the sleeve and bears it into frictional engagement with the clutch member $b^8$. The gear $a^5$ is moved in a similar manner. This movement of the pulleys $b^5$ or $b^6$ into engagement with their clutch members clutches them to the sleeve $B^2$ and transmits motion to the same. Suitable springs are provided for disengaging the friction-surface when the clutch-collar $c^3$ is withdrawn. Clutch-collar $c^3$ is actuated by means of crank-lever $b^9$, fixed to shaft $b^{17}$, which is journaled in the sides of the main frame. On the projecting end of shaft $b^{17}$ is fixed the hand actuating-lever $b^{18}$, by means of which the clutches are controlled.

Sleeve $B^2$ carries at one end pinion or gear $b'$, meshing with gear $a^5$, which is firmly fixed to sleeve of gear $a^4$, which is loosely journaled on main spindle B. Gear $a^4$ engages with gear $b$, which is loosely journaled on back gear-shaft B'. A series of clutch-teeth are cut on the side face of gear $b'$ and also on the hub of gear $b$. Between the gear $b'$ and gear $b$ is located the double-ended clutch $b^3$, having clutch-teeth cut on either face adapted to engage with the clutch-teeth cut in gear $b'$ and in gear $b$.

Interposed between the sleeve $B^2$ and the gear $b$ is the collar $b^2$, which is feathered to back gear-shaft B'. Double-ended clutch-ring $b^3$ is in turn feathered to collar $b^2$.

$c^5$ represents a bushing splined to sleeve C' and adapted to be actuated by crank-lever $c^{19}$, which engages in a slot cut in its lower side. Crank-lever $c^{19}$ is firmly fixed to shaft $c^6$, which is journaled on the sides of the bed. Shaft $c^6$ also carries the lever $c^8$, which is adapted to engage in the curved slot in the lower end of lever $c^9$. $c^6$ also carries the external hand actuating-lever $c^{20}$. The function of this lever is to withdraw the gear $c^4$ from engagement with the gear cut in the periphery of the chuck C.

$a^6$ represents a double-ended tooth-clutch splined to the work-carrying spindle B and adapted to engage with corresponding clutch-teeth cut in the opposing faces of gears $a'$ and $a^4$. Double-ended clutch-ring $a^6$ is actuated by the crank-lever $c^{21}$, which is firmly fixed to shaft $a^7$, supported in the side walls of the main frame and carrying the external hand actuating-lever $c^{22}$. Shaft $a^7$ also carries firmly fixed to it the interlocking lever $c^9$, arranged to interlock with lever $c^8$.

For a given speed of the driving cone-pulley $a'$ it is possible to obtain, first, a direct belt speed employing no gearing, and, second, two quadruple-gear speeds and four double-gear speeds, making seven speeds in all. These speeds are obtained as follows: In order to obtain the slowest speed, the following combination must be made: Clutch $a^6$ must be in central position, gear $c^4$ must be in mesh with gear on chuck C, clutch-ring $b^3$ must be engaged with gear $b$, and clutch-collar $c^3$ must be thrown to the left, clutching gear $b^6$ to loose back gear-sleeve $B^2$. Gear $b'$ drives gear $a^5$, which in turn drives $a^4$ and $b$. $b$, being clutched to back gear-shaft B', drives it and in turn $c^4$ and chuck C. In this case there are four gear reductions. To obtain the next higher speed, the friction actuating-collar $c^3$ is thrown to the right, thereby obtaining a somewhat higher speed. To obtain the next higher speed, friction-clutch collar $c^3$ is thrown to the left and tooth-clutch $b^3$ is also thrown to the left, being actuated by crank-lever $c^{23}$, fixed to shaft $b^4$, supported in the side walls of the main frame and carrying the external hand actuating-lever $c^{24}$. $b^3$, engaging with $b^4$, takes up its motion and transmits it directly to back gear-shaft B', which transmits motion through gear $b'$ to gear $a^5$ on the spindle, gears $b$ and $b^5$ running as idlers. The next higher speed is obtained by throwing the friction-clutch $c^3$ to the right. To obtain the next increase in speed, it becomes necessary to withdraw the driving-pinion $c^4$ from the face-plate C. This is accomplished by throwing the external hand actuating-lever $c^{20}$ to the left as far as it will go. This causes the interlocking lever $c^8$ to be withdrawn from the circular slot in interlocking lever $c^9$ and to take up the position shown by the dotted lines in Fig. 5. It will now be obviously possible to move the double-ended clutch-ring $a^6$ in either direction. In order to obtain the speed desired, it is necessary to engage clutch-ring $a^6$ with gear $a^4$, when it is possible to obtain two more double-gear speeds due to the two positions of $c^3$. It will be noticed that when the gear $c^4$ is withdrawn and lever $c^8$ takes up the dotted position gear $c^4$ is locked by a movement of interlocking guides $c^9$ in either direction, so that it is impossible to engage the gears in such a manner as to cause breakage. If now hand actuating-lever $c^{22}$ is thrown to the left, it will cause double clutch-ring $a^6$ to engage with $a'$, thereby transmitting the motion of driving cone-pulley A' directly to the work-carrying spindle B and giving the highest speed.

Motion is transmitted to the feed-shaft or work-shaft operated direct from the lathe-spindle as follows: D, Figs. 1, 2, and 5, represents a gear rigidly mounted upon the main spindle B and transmitting motion to gears D', $D^2$, $D^3$, and $D^4$, with a gear $D^5$ on a sleeve $D^6$ upon the traversing screw-shaft $D^7$. $D^8$ represents a gear loosely mounted on a work-shaft $D^9$. $d\ d'$ represent loose belt-pulleys journaled on the shaft $D^7$. $d^2$ represents a driving-pulley keyed to said shaft, so that the same may be driven in either direction by means of a straight belt and a cross-belt having appropriate shifting mechanism to be hereinafter explained. Connected to the hub of the pulley $d$ is a gear $d^3$, meshing with a gear $d^4$, loose on shaft $D^9$. $d^5$ represents a clutch splined to the shaft $D^9$ and normally in engagement with the gear $D^8$, but capable of being thrown into an intermediate position or into engagement with gear $d^4$.

E represents a belt-shifting shaft, which is thrown through a partial revolution by means of a hand-lever E' on the apron of the carriage. (See Figs. 23 and 24.) Hand-lever E' partially rotates the gear $E^2$.

$E^3$ represents a gear meshing with gear $E^2$, journaled in a boss $E^4$ in the apron and splined to the belt-shifting shaft E, allowing the belt to be shifted by hand. It is also shifted automatically, as will be hereinafter explained.

A partial rotation of the shaft E in one direction brings the cross-belt on the pulley $d^2$ and a partial rotation in the opposite directions brings the straight belt onto the pulley $d^2$ through the following mechanism: $e$ represents a cam mounted on the shifting shaft E and the slot $e^{10}$ engaging with a lever $e'$, (see Fig. 1,) which in turn throws the belt-shifting rod $e^2$ to shift the belt backward or forward. Secured to the end of the belt-shifting shaft E is a cam $e^3$, (see Figs. 2, 3, and 26,) which engages a lever $e^4$, connected to a sleeve $e^5$, journaled on the stud-shaft and carrying a brake-shoe $e^6$, which is brought into engagement with rim of pulley $d^2$, when the shaft E is in a central position, to lock the said pulley and its shaft $D^7$ against rotation. This shaft $D^7$ is only used to rapidly move the carriage or turret to and from the work. It is only used intermittently. It is thus held stationary except when it is brought into operation by belt-shifter shaft, which unlocks the brake when the reversing-shaft is revolved. This shifting shaft can also be automatically tripped at the limit of the apron travel by means of collar $e^7$ coming in contact with the rear end of the gear $E^3$, which shifts the shaft E endwise, and thereby throws the lever $e'$ to shift the belt. This endwise movement in turn acts upon the crank-arm $e^8$ and through connecting-rod $e^9$ throws the clutch $d^5$.

The shafts $D^7 D^9$ are employed interchangeably in feeding the turret and apron in the following manner: $A^3$ represents ways on the frame A on which the turret travels. The rear end of the shaft $D^7$ is screw-threaded and receives an internally-screw-threaded nut F, journaled in a lug projecting from the apron G, attached to the turret carriage or slide. F' represents a worm-wheel cut upon one end of the nut F. The nut F is held against revolution by the worm-wheel and the worm $h^2$ on the shaft I, and the apron and carriage driven by turning the screw-shaft $D^7$, or the screw-shaft $D^7$ may be locked into a stationary position by the brake $e^6$ and the nut F rotated to feed the apron along the screw-shaft by means of transmitting bevel-gears $F^3 F^4$, mounted on the work-shaft $D^9$, and the gear $F^9$, mounted on shaft $f$, which is journaled to the apron. $D^9$ is the work-feed shaft and is ordinarily driven in ratios relative with the main lathe-spindle B through the gear $D^8$, as heretofore explained. This work-shaft $D^9$ controls the main feeds of the lathe through the bevel-gear mounted thereon, and as it is necessary to feed forward and backward reversing-gears are provided. Motion through shaft $D^9$ to feed the turret-slide forward is obtained by driving the nut F on shaft $D^7$. The brake $e^6$, of course, being applied upon the driving-wheel $d^2$, holds the shaft $D^7$ from rotation. The main turret is also rotated by power obtained from the work-shaft $D^9$, and these motions are obtained by the following mechanisms: $F^2$ represents a sleeve splined upon the shaft $D^4$ and carrying miter-gears $F^3$ $F^4$ on sleeve $F^2$. This sleeve is shifted to reverse motion by means of a star-lever $F^5$, which carries an eccentric-pin $F^6$, (see Fig. 12,) which in turn shifts the rock-shaft $F^7$ by means of a slotted rock-arm $F^8$ and crank-pin $F^6$ to throw the sleeve $F^2$. This brings either one or the other of the gears $F^3$ $F^4$ into engagement with miter-gear $F^9$ on the shaft $f$.

It is desirable to use a change of speed for feeding the turret-carriage, and this is obtained by a series of interchangeable gears mounted upon shafts preferably journaled in the apron. $f$ H represent such shafts. Mounted on the shaft $f$ within the apron are a series of spur-gears $f'$ $f^2$ $f^3$ $f^4$. (See Fig. 18.) $f^5$ $f^6$ $f^7$ $f^8$ represent a series of gears loosely mounted upon shaft H.

$f^9$ represents a series of dogs mounted in recesses of the shaft H and strung upon a shifting-bar H' seated in slot in shaft H.

$H^2$ represents a sleeve sliding in the outer end of the shaft H, adapted to be shifted thereon by means of a lever $H^3$. The sleeve $H^2$ is in engagement with the lug on the end of the shifting-bar H' to shift the bar endwise in its slot in the shaft H.

$H^4$ represents a series of notches in the edge of the shifting-bar, into which the tapered lugs $H^5$ of the dogs $f^9$ are adapted to drop, whereby the dog is permitted to spring forward and enter a recess in the hub of the respective gears $f^5$, $f^6$, $f^7$, and $f^8$, each of which is provided with a dog $f^9$ and engaging with a corresponding notch in the shifting-bar lever H', the arrangement of these notches being such that only one dog can be in engagement with its corresponding gear at any time. Thus either one of the series of change-gears $f^5$ to $f^8$ may be coupled to shaft H, if desired.

$i$ represents springs for throwing the dogs $f^9$ into engagement with the respective gears.

$H^6$ represents a gear keyed on the shaft, meshing with a gear $H^7$ on the sleeve $H^8$, journaled in the apron and clutched to the transmitting-shaft I. Sleeve $H^8$ carries a spiral gear $H^9$, driving a spiral gear $h$ on the shaft $h'$. (Shown in dotted lines, Fig. 19.)

$h^2$ represents a worm on the shaft I, meshing with the worm F' of the feed-nut F.

$h^3$ represents a hand-lever keyed to the shaft I, by means of which the turret may be fed by hand, if desired.

$h^4$ represents a friction-clutch splined to the shaft I and adapted to clutch the gear $H^7$ to the shaft I. This clutch is engaged and disengaged with gear $H^7$ by means of a knurl-nut $h^5$, the stem $h^6$ of which carries a pin which serves to shift the clutch $h^4$ into or out of engagement with the gear $H^7$.

The supplemental turret G' is provided with feeding mechanism, preferably screw-shaft G', and motion is imparted to this shaft by the following devices, (see Figs. 6 and 7:) The upper end of the shaft $h'$ is provided with a clutch member $h^7$, engaging clutch member $h^8$, which in turn drives the feed-screw $g'$ of the supplemental turret G'.

$g^2$ represents a hand-lever for shifting the clutch member $h^7$ into or out of engagement with the clutch member $h^8$.

The supplemental turret is fed laterally across the ways formed on the face of the main turret J. The supplemental turret is set at an angle or mounted in an inclined way, so that the tools projecting therefrom will not interfere with the tools carried by the sockets of the main turret. This supplemental turret is capable of revolution by hand and is provided with a centering-pin $G^2$, which may be thrown out of engagement by hand-lever $G^3$, the inner end of which is provided with gear-teeth engaging a rack on the pin $G^2$.

$G^4$ represents a spring-actuated rod provided with a rack, also engaging the teeth of the lever $G^3$, whereby the pin $G^2$ is automatically brought into engagement with the revolving portion of the turret.

$G^5$ represents a clamping-nut for clamping the supplemental turret on the stud-shaft to hold it in its adjusted position $G^6$.

The turret mechanism is constructed and operated as follows: The main turret is held by a power-clamp when it has been properly centered. The bottom face of the turret contains a number of recesses $j$. $j^2$ represents a spring centering-pin, which is shown in Fig. 6 as engaging with one of said recesses. This pin is operated automatically by the following mechanism: K represents a spiral gear splined on the shaft $D^9$ and journaled in the bracket K', projecting from the apron G. $K^2$, Fig. 11, represents a spiral gear meshing with the gear K and carrying a ratchet-wheel $K^3$. (See Fig. 14.) This gear $K^2$ is mounted loose upon shaft $K^4$. $K^5$ represents a cam-wheel provided with a spring-pawl $K^6$, adapted to engage the teeth of the ratchet-wheel $K^3$. $K^7$ represents a gear on the opposite end of the shaft $K^4$, driving a gear $K^8$ on the shaft $K^9$. L represents a cam-wheel, also on the shaft $K^9$, carrying a roller L' and provided with a boss $L^2$. (See Fig. 9.) $k$ represents an arm pivoted on the shaft $K^9$ and carrying collar $k'$, resting on the face of the cam $K^5$, while the outer end of the arm $k$ engages with pin $k^2$ to reciprocate the centering-pin or lock-bolt $j^2$. This pin is constructed in the following manner, (see Fig. 6:) $L^3$ represents a bushing in which the pin $j^2$ seats. $L^4$ represents a cap screwed over the lower end of the pin $j^2$ and between which and the bushing $L^3$ is a spring $L^5$ for retracting the pin from the recess in the turret as soon as the roller $k'$ has passed off from the lug of the cam $K^5$. The interior of the pin $j^2$ is bored out to receive rod $L^6$, on the upper end of which is mounted a spring $L^7$, which when the pin $j^2$ is forced into the recess in the turret by means of the cam $K^5$ is compressed sufficient to take up inequalities in the various recesses. After the centering-pin has been inserted into the recess in the under face of the turret it becomes necessary to clamp the turret rigidly into position to withstand the strain of the tool. This I accomplish in the following manner: $L^8 L^9$ represent two segments of an expansion (see Figs. 11 and 13) or split ring provided with a beveled flange or groove in the face engaging the annular flanges $l'$ of the carriage and turret, respectively. I have provided power devices for operating said clamp-ring. These ring-sections abut against screws or stud $l^2$ at one end, while at the opposite end they are provided with pivoted butts $l^3$, engaging a right and left threaded screw-rod $l^4$, which is turned a short distance in either direction to spread or draw the two sections toward each other, and thereby clamp and unclamp the turret from the carriage. $l^5$ represents a lever located in the apron for turning this screw-rod $l^4$. $l^6$ represents a roller riding on the face of the cam-wheel L, by means of which the segments $L^8 L^9$ are clamped and unclamped during different portions of the revolution of this cam-wheel.

M represents a ratchet pivoted upon the end of shaft $M'$ and provided with a crank-arm or oscillating lever $M^2$, having a slot adapted to engage roller $L'$, which travels therein, (see Figs. 6, 10, and 11,) whereby at each revolution of the cam-wheel L the crank-arm $M^2$ and ratchet $M^3$ are moved back and forth slightly more than one-sixth of a circle, as shown in Fig. 6, which shows it in the central and normal position, Fig. 29, which shows it nearly in the extreme left position, and Fig. 30, which shows it nearly in the extreme right position. The ratchet M on the end of crank-arm $M^2$ is held, by means of springs $m$, in engagement with a ratchet-wheel $M^3$, keyed on the shaft $M'$, each provided with six ratchet-teeth in the faces thereof, whereby at each revolution of the cam-wheel L the shaft $M'$ is caused to travel one-sixth of a revolution to and fro.

$M^4$ represents a bevel-gear on the shaft $M'$, engaging a gear-ring $M^5$ on the inner face of the turret J. The relative proportion of these gears $M^4 M^5$ that for each sixth of a revolution of the shaft $M'$ the turret makes one-eighth of a revolution on the carriage, the proper distance for bringing another tool-holder $J^2$ into central position ready for use.

The mechanism for releasing the lock and revolving the turret is as follows: Gear K continuously revolves the gear $K^2$ and ratchet-wheel $K^3$. $m'$ represents a lever engaging the end of the pawl $K^6$ and holding the pawl out of engagement with ratchet-wheel $K^3$. The opposite end of this lever engages a cam $m^2$ on the shaft of the tripping-lever N. When the lever N is thrown forward by the operator, the lever $m'$ is freed from the end of the dog $K^6$, which engages the ratchet-wheel $K^3$, and causes the cam $K^5$ to make one revolution. The oscillating lever makes one-sixth of a revolution to and fro, thereby revolving the turret one-eighth of a revolution. The result of this revolution has been that the cam $K^5$ has retracted the centering-pin $J^2$ at the first movement of starting, and the cam-wheel L, being revolved through the transmitters $K^7 K^8$, releases the lever $l^5$, which unclamps the turret from the carriage. The cam-wheel L then, continuing its rotation, carries the crank-arm $M^2$ of ratchet M through one-sixth of a revolution and carrying with it the shaft $M'$ and gear $M^4$, which in turn rotates the turret one-eighth of a revolution, after which the cam $K^5$ inserts the centering-pin into the recess of the turret and the lever $l^5$ is lifted to clamp the turret in place and the movement stops in that position.

If it is desired to move the turret more than one space, the hand-lever N is tripped again, or it may be thrown over and left in that position until the turret has nearly reached the requisite position, when the lever is thrown back and the turret is stopped and clamped as soon as it has reached the centering position.

In order to provide an automatic stop for the forward movement of the turret-carriage corresponding to the different feeds required for the several different tools, the following mechanism is provided: O, Fig. 17, represents a shifting rod mounted in brackets $O'$ on the end of the frame of the machine. This rod has eight grooves cut in the periphery thereof, in which are seated the rods or bars $O^2$. These rods are screw-threaded at their rear ends and fitted into the screw-threaded adjusting-sleeves $O^3$, whereby they may be adjusted endwise in their several grooves in the shifting bar. $O^4$ represents set-screws for holding the parts to their adjusted position. At regular intervals along the bar $O^2$ are provided notches $O^5$, in each one of which notches upon said bar is secured a tappet or stop $O^6$. $O^7$ represents a spiral gear journaled in a bracket $O^8$, projecting from the turret-carriage. This gear-sleeve is hollow and through it passes the stop-bar O. $O^9$ represents a lug upon the inner side of the hollow gear $O^7$ in position to strike one or the other of the several tappets $O^6$. This gear $O^7$ is driven by means of a spiral gear $o$, mounted on the shaft $M'$ at such a relative speed as to cause the lug $O^9$ of the gear $O^7$ to travel one-eighth of a revolution for each eighth of a revolution of the turret, thereby bringing the lug $O^9$ each time opposite the tripping-bar $O^2$ corresponding to the tool which is central or in working position with the turret, whereby the forward travel of the turret-carriage is automatically and independently tripped at different positions in its forward travel, according to the tool which happens to be in use.

The manner of stopping the feed by stop-bar O is as follows: As the lug $O^9$ strikes one of the tappets $O^6$ the stop-bar O is thrown forward a short distance, acting on the lever P and, through this lever and connecting-rod P', upon the crank-arm $e^8$, (see Fig. 3,) to which is connected the lever $e^9$, which shifts the clutch $e^{10}$, disconnects the gear $D^8$, and stops the feed.

When the operator desires to run the turret back by the fast traversing screw-shaft, he moves lever E' back, which is connected by bevel-gearing to shaft E, which releases the brake $e^5$ from the driving-pulley $d^2$, and cam $e^{10}$ engages a pin on crank-lever $e'$, bringing the driving-belt onto the tight pulley $d^2$, which rotates the traverse-shaft $D^7$. This drives the turret-carriage backward. When it strikes tapper $e^7$, it retracts rod E and shifts the driving-belt back onto the loose pulley $d$. This pulley $d$ carries on its hub a gear $d^3$, which meshes with gear $d^4$ on shaft $D^9$, and thus transmits fast speed to the same, the clutch $d^5$ being thrown by the same movement of the rod E to clutch said gear $d^4$ to its shaft. I thus obtain a fast speed for rotating the turret, as will be hereinafter explained.

In Fig. 25 I have shown the detail of the position of the various parts of the shifting devices. When lever E' is in a vertical position, cam $e^3$ is in the position shown in full lines, raising lever $e^4$. (See Fig. 26.) When in this position, the brake is applied to pulley $d^2$. When lever E' is thrown to the rearward, cam $e^3$ is thrown forward, and one of the driving-belts is on pulley $d^2$, the brake being released. When lever E' is thrown backward, cam $e^3$ is thrown to its extreme position to the right (see dotted lines, Fig. 26) out of engagement with lever $e^4$, and one of the fast driving-belts is thrown on pulley $d^2$, so that the traversing shaft $D^7$ can be readily employed to move the carriage either forward or back by the movement of lever E', or it can be held in a fixed position by the brake to enable the work-shaft to operate the carriage or the various feeds.

The power-feeds are all driven by the reversing-gear $F^3$ or $F^4$, which drives $F^9$ on shaft $f$, which, through one of its gears, transmits motion to the shaft H. Gear $H^6$ on said shaft, meshing with gear $H^7$ on shaft I, (see Figs. 18 and 19,) drives shaft I. The worm $h^2$ on said shaft drives the worm-wheel F' on the revoluble nut F. When this power is employed, gear $H^7$ is clutched to the shaft I by the friction clutch member $h^4$. It is frequently desired to control the feed of the turret-carriage forward and backward by hand. This is accomplished by slacking nut $h^5$, releasing clutch $h^4$, and turning a hand-wheel. This drives the revoluble nut L and feeds the carriage accordingly.

It is necessary when the main turret is revolved to unship the feeding mechanism of the supplemental turret. This is accomplished by means of lever $g^2$ and an eccentric on the end of its shaft engaging with a groove of sleeve $h^{11}$, which slides on shaft $h'$, carrying the clutch-teeth $h^7$, that mesh with the clutch-teeth $h^8$ on stud-shaft $h^{12}$. (See Figs. 6 and 7.) In Fig. 6 this gear is unshipped when the lever $g^2$ is in the position shown in full lines and the clutch is in position as shown in dotted lines.

There are various advantages obtained by the various lathe mechanisms herein shown. The lathe is adapted to do a large range of work, heavy as well as light work, accurately and more expeditiously than other tools hitherto employed for this purpose. In fact, the lathe is adapted to rapidly, accurately, and economically turn, bore, thread, and finish a wide range of castings which are usually held in position by a chuck.

Among the advantages obtained are the employment of a rapidly-moving traverse-shaft for running the main turret back and forth and employing a secondary or work shaft for feeding the tools to their work instead of depending upon the work-shaft for running the carriage back or for adjusting the same. This is extremely important in lathes adapted to finish work several feet in length and of large size requiring a slow feed. The rapid traversing of the carriage backward and forward by an independent traversing shaft saves a large amount of time and hard labor. Again, when it is desired to move the carriage and turret by hand, the rapid traverse-shaft may be employed for this purpose to quickly adjust the tool in position. As different kinds of work require different rates of turret-feed, by means of my change-gears on shaft $f$ and $h$ four different tool-feeds may be obtained independent of the spindle-feed, which has of itself a large range of speeds, and these speeds of the shaft $f$ and $h$ may be varied by an increase of the change-gears. The speed-changes for feeding the supplemental turret are varied in like manner by the change-gears on the shaft $f$ and H. It is of manifest advantage to employ a great variety of tools, each supported in its own tool-holder, and also to employ means to use in succession roughing and finishing tools or two or more different tools at the same time. This requires strong and rigid supports for the tool-holders, as well as strong power devices and means for rapid changing of tool by revolubly adjusting the turret and the longitudinal adjustment of the turret-carriage, all of which means are provided by the mechanisms herein shown and described.

I have shown the traverse-shaft threaded and engaging a nut fixed to the tool-carriage, which nut is also adapted to be revolved by the work-shaft when it is employed for work-feeds. I do not wish to limit myself to this precise class of longitudinal feeding devices, as a rack-feed or other well-known feeds may be employed without materially affecting the mode of operation.

The means herein shown for revolving the main turret by power, also in stop movements to correspond with the distance which the tool-holders are apart from each other, and also the means for automatically stopping the revolution of the turret at any desired interval and the means for registering and clamping the turret automatically are highly useful. They not only accelerate the operation of the lathe, but they save labor in the operator and are quick and accurate in their adjustments.

The traversing shaft is shown driven by reversing belt and pulleys. This is a convenient method of operating the traversing shaft at a high rate of speed as well as for holding the shaft against rotation by a brake which is applied automatically by the shifting mechanism. The same general results could be obtained by shifting gears; but the belt-drive is preferred because of its simplicity and cheapness.

Having described my invention, what I claim is—

1. In a lathe employing a main spindle, a geared chuck secured thereto, a series of loose gears journaled on said spindle, a clutch journaled on the spindle between the loose gears, in combination with a back gear-shaft, loose gears journaled thereon and meshing with the gears of the main spindle, clutch and lever mechanism for clamping said gears to their shafts whereby various rates of speed for the work-chuck are obtained, substantially as specified.

2. In a lathe employing a main spindle, a geared chuck secured thereto, a series of loose gears and clutches journaled on said spindle, in combination with a back gear-shaft having a spur-gear adapted to engage and disengage the chuck-gear, a series of sleeves on said shaft, a series of loose gears journaled thereon, clutches intermediate of said loose gears journaled on said shaft and lever mechanisms for connecting and disconnecting the said gears to their respective supporting-shafts, whereby a varying range of speeds is obtained by the different train of gears, substantially as specified.

3. In a lathe employing a main spindle, a geared chuck secured thereto, a series of gears loosely journaled on said spindle, clutches for locking said gears to the spindle, in combination with a back gear-shaft B', a series of gears journaled on sleeve B², a series of clutches and lever mechanism for clutching said gears to their sleeves, a loose gear journaled on said back shaft, a clutch for locking said gear to its shaft and a shipping-gear $c^4$ and mechanism for connecting and disconnecting it with the geared chuck, whereby the chuck may be driven from the main spindle or from the back gear-spindle or by the changeable train of gears, substantially as specified.

4. In a turret-lathe employing a traveling carriage, a revoluble turret mounted thereon, a supplemental turret removably mounted on the main turret, carriage-feeding and turret-actuating mechanisms, means for operating said feed devices by power taken from the lathe-spindle, in combination with alternate fast driving mechanism connected to and capable of operating the carriage traverse devices independent of the feed of said spindle, substantially as described.

5. In a lathe employing a reciprocating tool-carriage, a traverse feed-screw shaft engaging with a revoluble nut mounted on said carriage, means for driving said shaft independent of the lathe-spindle, a work-feed shaft driven from the lathe-spindle and carrying transmitting-gear, actuating mechanism which communicates motion to the feed devices of the tool-carriage whereby said carriage is capable of being driven from the work-shaft independent of the traverse-shaft, substantially as herein described.

6. In a lathe, employing a tool-carriage, a traverse feed-shaft driven independent of the spindle and provided with means for communicating longitudinal motion to said tool-carriage, loose and fast driving-pulleys mounted on said shaft, belt-shifting mechanism mounted upon said lathe and operated by lever mechanism for shifting said belt and reversing the motion of said shaft, substantially as specified.

7. In a lathe employing a tool-carriage, a traverse feed-shaft driven independent of the spindle and provided with means for communicating longitudinal motion to said tool-carriage, loose and fast driving-pulleys mounted on said shaft, a brake adapted to engage the fast pulley, a straight and cross belt, belt-shifting mechanism connected to said belts and lever mechanism adapted to simultaneously operate the brake and belt-shifting mechanism, substantially as herein specified.

8. In a lathe employing a reciprocating carriage, a turret revolubly mounted upon the carriage-bed, power-driving mechanism actuated from the work-shaft and operating a train of transmitters having a revoluble tripping-cam adapted to revolve the turret one step at each revolution of said cam and lever mechanism connected thereto adapted to automatically unship the power at the end of such revolution of said cam, substantially as specified.

9. In a turret-traversing mechanism, a carriage, a turret revolubly mounted thereon, a reversible traversing screw engaged with a revoluble nut journaled in the carriage, a worm engaged with a worm-wheel fixed to a revoluble nut, variable-feed mechanism connected to said nut having gear connections with a work-shaft driven from the main spindle and reversing mechanism applied to said carriage and work-shaft, substantially as specified.

10. In combination with a revoluble turret mounted on a traveling bed, an apron-carrying operating mechanism adapted to rotate said turret, an inner beveled recess provided in the base of said turret, expanding clamping lock mechanism located in the carriage and adapted to frictionally engage the beveled inner periphery of the turret-recess when expanded, and means for expanding and contracting said locking mechanism, substantially as described.

11. In a lathe employing a longitudinally-traveling turret-carriage, a turret revolubly mounted thereon, in combination with a work-shaft employing reversible transmitting-gear operating a series of transmitters imparting longitudinal motion to the turret, a series of transmitters imparting rotary motion to the turret and a series of transmitters imparting lateral motion to a supplemental turret, mounted on the main turret and shipping-levers for connecting and disconnecting each of said series of transmitters, substantially as specified.

12. In a turret-lathe employing a longitudinally-moving carriage, a turret revolubly mounted therein and containing a series of tool-sockets $J^2$, supplemental turret $G'$ mounted on slides $G^3$, a power feed-shaft G journaled on the bed of said turret and means for revolving said turret, means for feeding said supplemental turret laterally, both of which feeding movements receiving their motion from a common work-shaft and lever mechanism connecting and disconnecting the said power-actuating mechanism, substantially as specified.

13. In a turret-lathe, the combination of a sliding carriage, a revoluble turret mounted thereon, a supplemental turret revolubly mounted and eccentrically disposed upon the face of the main turret and carrying a plurality of tool-holders, substantially as described.

14. In a turret-lathe, in combination with a main turret, a plurality of tool-holders mounted on the face thereof, one of said tool-holders being in the form of a secondary revoluble turret also carrying a plurality of tool-holders, substantially as described.

15. In a turret-lathe a sliding carriage, a turret revolubly mounted thereon carrying a supplemental revoluble tool-holder adapted for carrying a plurality of cutting-tools and mounted on a slide on the main turret and means for traversing the main turret and means for feeding the said supplemental turret transversely to the line of travel of the main turret, substantially as specified.

16. In a turret-lathe employing a revoluble main turret and a longitudinally-traveling supplemental turret mounted thereon, in combination with a train of transmitters for feeding said supplemental turret receiving motion through shaft I, the transmitting-gear $H^7$ the friction $h^4$ the knurl $h^5$, the hand-wheel $h^3$ for shipping and unshipping the longitudinal feed of the main carriage substantially as specified.

17. In a turret-lathe employing a traverse-shaft connected to and operating the tool-carriage and driven by belts independent of the speed of the main spindle, a work-shaft having two loose gears mounted thereon, one having gear connections with the spindle and the other geared to the traversing shaft, a clutch intermediate of said gear, shipping mechanism for operating said clutch, connected by shipping-levers to stop devices actuated by the carriage whereby said gears are automatically clutched and unclutched by the tool-carriage travel so as to drive said work-shaft at different speeds for the different feed movements, substantially as specified.

18. In a turret-lathe employing a traversing shaft for rapidly moving the carriage and a work-shaft employing transmitting-gears transmitting motion to a revoluble nut engaging the screws of the work-shaft, the combination with the transmitting-gear of the work-shaft connected to the revoluble screw by a clutch mechanism, of the worm $F'$ connected to said nut, the shaft I geared to the revoluble nut F, the clutch $h^4$, the driving-gear $h^7$ and the hand-wheel $h^3$, the shipping-rod $h^6$ and the nut $h^5$ whereby the power-feed of the work-shaft $D^9$ may be connected and disconnected, substantially as specified.

19. In a turret-lathe employing a traveling tool-carriage with traversing shaft operating a revoluble driving-nut, in combination with the work-shaft $D^9$, the bevel reversing-gears $F^3$, $F^4$, the transmitting-gear $F^9$, the shafts H, I, and the transmitting-gears mounted thereon the worm $h^2$ on shaft I and the revoluble nut F and gear $F'$ whereby motion is transmitted to said nut from the work-shaft by worm-gear connection, substantially as and for the purpose specified.

20. In a turret-lathe employing a reciprocating tool-carriage, a main turret mounted thereon, a supplemental turret mounted on the main turret, a traverse feed-screw engaging with a revoluble nut mounted on said carriage, means for driving said shaft independent of the main spindle, and changeable-gear mechanism driven from the main spindle communicating motion to said traverse feed-shaft, said mechanism being adapted to be alternately employed, substantially as described.

21. In a turret-lathe, a revoluble turret rotating on a traveling carriage, a gear for rotating said turret engaging with a gear on a shaft journaled in the carriage which shaft carries a gear driving a gear fixed to the turret, a stop-sleeve surrounding a stop-bar supported in the main frame and carrying an abutment adapted to engage with the independently-adjustable stops carried on the stop-bar, substantially as and for the purpose set forth.

22. In a turret-lathe, a carriage, a revoluble turret mounted thereon, a supplemental turret revolubly mounted on the main turret, the main turret having a gear affixed thereto actuated by a gear fixed to a shaft journaled in the carriage and means for rotating the said carriage-shaft by power mechanism located outside of the bed, substantially as described.

23. In a turret-rotating mechanism, the combination of gear K with gear K², clutch K⁵, clutch-dog K⁶, shaft K⁴, gears K⁷ and K⁸, crank-disk L, crank-pin, vibrating lever M² ratchet M³, shaft M′, bevel-wheels M⁴ and M⁵, stop-lever M¹¹, cam $m^2$ and hand actuating-lever N, adapted to engage and operate turret-rotating shaft, substantially as and for the purpose set forth.

24. In a turret-rotating mechanism, the combination of gear K with gear K², clutch K⁵, clutch-dog K⁶, shaft K⁴, gears K⁷ and K⁸, crank-disk L, crank-pin, vibrating lever M², ratchet M³, shaft M′, bevel-wheels M⁴ and M⁵, stop-lever M¹¹, cam $m^2$, hand actuating-lever N, locking-pin lever $k$, cam K⁵ and lock-bolt $j^2$, adapted to rotate the turret and actuate the lock-bolt, substantially as and for the purpose set forth.

25. In a turret-lathe employing a locking-bolt, means for mechanically seating said bolt in its turret-recess, a compensating spring engaging said bolt and interposed between the bolt-seating mechanism and the bolt-seat, substantially as described.

26. In a turret-lathe a carriage, a revoluble turret mounted thereon, a supplemental turret revolubly mounted on the main turret, the latter named being provided with a series of recesses adapted to receive a lock-bolt supported in the carriage, mechanism for rotating said turret and actuating a cam for seating the lock-bolt at the termination of the intermittent turret movement and a spring for retracting the lock-bolt prior to the beginning of the intermittent turret movement, substantially as described.

27. In a turret-lathe, a work-shaft parallel to the axis of the lathe provided with power-driven devices, turret feeding and revolving mechanism connected to and adapted to be independently actuated by said power devices on the work-shaft, substantially as described.

28. In a turret-lathe employing a revoluble main turret, an inclined slide mounted thereon, a multiple revoluble tool-holder mounted on said slide whereby the tools carried by said multiple holder are made to clear the tools or fixtures carried by the main turret, substantially as described.

29. In a turret-lathe, a carriage supporting a revoluble turret, a gear on said turret engaged with a gear on a shaft supported in the carriage, a shaft driven from an independent source of power and means for intermittently rotating the turret by mechanism adapted to start the turret from a state of rest with a gradually-accelerating velocity and to stop the same with a gradually-decreasing velocity, substantially as and for the purpose set forth.

30. In a turret-lathe, a carriage supporting a revoluble turret, a gear on said turret engaged with a gear on a shaft supported in the carriage, power devices independent of the main spindle, actuating a ratchet on said shaft through a vibrating lever arranged to engage in said ratchet and a crank for operating said lever, substantially as and for the purpose set forth.

31. In a turret-lathe a carriage supporting a revoluble turret, a gear on said turret engaged with a gear on a shaft supported in a carriage driven by power devices independent of the main spindle actuating a ratchet on said shaft through a vibrating lever arranged to engage in said ratchet, a crank for operating said lever, and clutch mechanism arranged to automatically start and stop said crank at the end of a revolution, substantially as and for the purpose set forth.

32. In a turret-lathe, a carriage supporting a revoluble turret, a gear on said turret engaged with a gear on a shaft supported in a carriage, driven by power devices independent of the main spindle actuating a ratchet on said shaft through a vibrating lever and arranged to engage said ratchet, a crank for operating said lever, clutch mechanism arranged to start and to automatically stop said crank at the end of a revolution and a locking-pin actuated by a cam, rotating in unison with said crank, substantially as and for the purpose set forth.

33. In a turret-lathe, the combination of a work-shaft adapted to be driven from an independent source of power, a gear splined thereto, journaled in the turret-carriage and engaging with a loose gear carrying a ratchet adapted to engage with clutch-dog carried on a disk, coaxial with said driving-gear and supported on the same shaft, said ratchet-driving mechanism adapted for withdrawing the lock-bolt, rotating the turret through one space and clamping the turret to its supporting base or carriage, substantially as and for the purpose set forth.

34. In a turret-lathe, a carriage, a turret supported revolubly thereon, a slide on said turret, a tool-post mounted upon said slide, means for feeding said tool-post by power, and shipping mechanism for connecting said feeding devices when the tool-post is in operative position, substantially as and for the purpose set forth.

35. In a turret-lathe, a turret-carriage with a revoluble turret mounted thereon, in combination with a slide on said turret, a tool-post adapted to move on said slide, a feed-screw actuating said tool-post, a gear on said screw engaging with a gear mounted on a clutch-shaft provided with teeth adapted to engage with a transmitting-shaft journaled in the carriage and driven by the carriage-feeding mechanism, substantially as specified.

36. In a lathe, in combination with a reciprocating tool-carriage and a main turret revolubly mounted thereon of an inclined supplemental turret mounted on a traversing slide fixed to the main turret-bed, means for feeding said turret transversely across the line of travel of the main turret, feeding devices for moving the main turret longitudinally, both of said feeds being obtained from the same prime mover on the work-shaft, substantially as specified.

37. In a turret-lathe, employing a traveling carriage carrying a revoluble turret and feeding devices for moving said carriage, in combination with a stop-bar, parallel to the axis of the lathe supported on the main frame, a stop-sleeve journaled on said stop-bar, a plurality of independent adjustable tappets carried on said stop-bar and mechanism operated by the engagement of said sleeve with a tappet which unships the turret-feed, substantially as specified.

38. In a turret-lathe, employing a traveling carriage supported on the main frame, a revoluble turret mounted thereon and feeding mechanism for driving the carriage, in combination with a stop-bar supported upon the main frame and parallel with the line of carriage-travel, a plurality of independent adjustable stops fixed to said stop-bar, a rotating sleeve surrounding said stop-bar and adapted to engage with either one of said stops moving said stop-bar which actuates mechanism to unship the carriage-feed by the actuation of said stop-bar, substantially as specified.

39. In a turret-lathe employing a main frame a revoluble turret mounted upon the traveling carriage, feed mechanism for moving said carriage, in combination with a stop-bar supported on said lathe parallel to the line of carriage-travel, a plurality of independent adjustable stops a rotating sleeve encircling said stop-bar journaled to the carriage, geared to rotate in unison with the turret and adapted to engage with either of the stops, mechanism connected to said stop-bar adapted to unship the carriage-feed which mechanism is actuated by the engagement of said sleeve with one of said stops, substantially as specified.

40. In a turret-lathe, a main frame, a carriage sliding thereon supporting a revoluble turret, a sleeve journaled in the turret-carriage, means for rotating said sleeve in unison with the turret, an abutment in the sleeve, a stop-bar whose axis is parallel to the direction of the turret movement carrying a plurality of independently-adjustable stops, one stop for each turret-tool, the stop-bar being journaled on the main frame so as to slide therein, means for disengaging the turret-feed by the end movement of the stop and a solid stop on the stop-bar arranged to limit the end movement of the stop-bar for the purpose of providing a fixed stop in addition to a feed-stop for each tool in the turret, substantially as specified.

41. In a turret-lathe, a main frame, a carriage sliding thereon supporting a revoluble turret, a sleeve journaled in the turret-carriage, means for rotating said sleeve in unison with the turret, an abutment in the sleeve, a stop-bar whose axis is parallel to the direction of the turret movement carrying a plurality of independently-adjustable stops, one stop for each turret-tool, the stop-bar being journaled in the main frame so as to slide therein, means for disengaging the turret-feed by the movement of the stop-bar endlong in its bearings, and a solid stop arranged to limit the endlong movement of the stop-bar in its bearings for the purpose of providing a fixed stop in addition to a feed-stop for each tool in the turret, and means for retracting the stop-bar so as to allow the turret-feed to be reëngaged, substantially as specified.

42. In a turret-lathe employing a traversing shaft, a work-shaft $D^9$ receiving motion upon the spindle to actuate the feeding mechanism on a tool-carriage traveling longitudinally on the bed of said lathe, the combination of the stop-rod O and sleeve $O^7$, the adjustable tappets mounted thereon with the shipping-levers P, $p'$ connected to a clutch-lever which operates a clutch $c^4$, the clutch-gear $D^8$ mounted on the work-shaft whereby the feeds operated by the work-shaft are automatically stopped by the forward movement of the tool-carriage independent of the operation of the traversing shaft, substantially as specified.

In testimony whereof I have hereunto set my hand.

CONRAD M. CONRADSON.

Witnesses:
OLIVER B. KAISER,
CHARLES F. DOLLE.